April 23, 1929.　　A. HOEKSTRA　　1,710,420
SEED BED LEVELER
Filed Jan. 6, 1927　　2 Sheets-Sheet 1

WITNESSES

Inventor
ALBERT HOEKSTRA
By Richard B. Owen, Attorney

April 23, 1929. A. HOEKSTRA 1,710,420
SEED BED LEVELER
Filed Jan. 6, 1927 2 Sheets-Sheet 2

WITNESSES
Inventor
ALBERT HOEKSTRA
By Richard B. Owen
Attorney

Patented Apr. 23, 1929.

1,710,420

UNITED STATES PATENT OFFICE.

ALBERT HOEKSTRA, OF SHELDON, IOWA.

SEED-BED LEVELER.

Application filed January 6, 1927. Serial No. 159,446.

This invention relates to land working and cultivating devices and pertains particularly to an earth pulverizing and leveling attachment for cultivators.

The primary object of this invention is to provide, in a manner as hereinafter set forth, a device adapted to be attached to the rear of a cultivator for breaking up the earth clods and for leveling and pulverizing the same.

The invention contemplates the provision of a plurality of rake elements carried on a hitch beam at an acute angle with respect to the path of forward travel of the cultivator to which attached. The racking elements are arranged in pairs, one of each pair comprising a heavy toothed rake for breaking large earth clods and a fine-toothed rake following for pulverizing the smaller lumps of earth and for leveling the ground to provide a smooth seed bed. Means is also provided whereby the fine-toothed rake will be protected against breakage by passing over large stones or other obstructions which the rake teeth can not break up.

Another object of this invention is to provide a cultivator attachment of the character described, which will be efficient, strong and durable, requiring little or no attention when in use, and comparatively inexpensive to manufacture.

Other important objects of the invention will become apparent as the description of the same proceeds, and the invention will be best understood from a consideration of the following detailed description taken in connection with the accompanying drawings forming a part of this invention with the understanding however, that the invention is not confined to any strict conformity with the showing of the drawings, but may be changed or modified so long as such changes or modifications mark no material departure from the salient features of the invention, as expressed in the appended claims.

In the drawings,

Figure 4 is a section taken upon the line 4—4 of Figure 1, looking in the direction indicated by the arrows.

Figure 5 is an enlarged detail in top plan of the connecting means between one of the large toothed rakes and a portion of the supporting frame.

Figure 1:
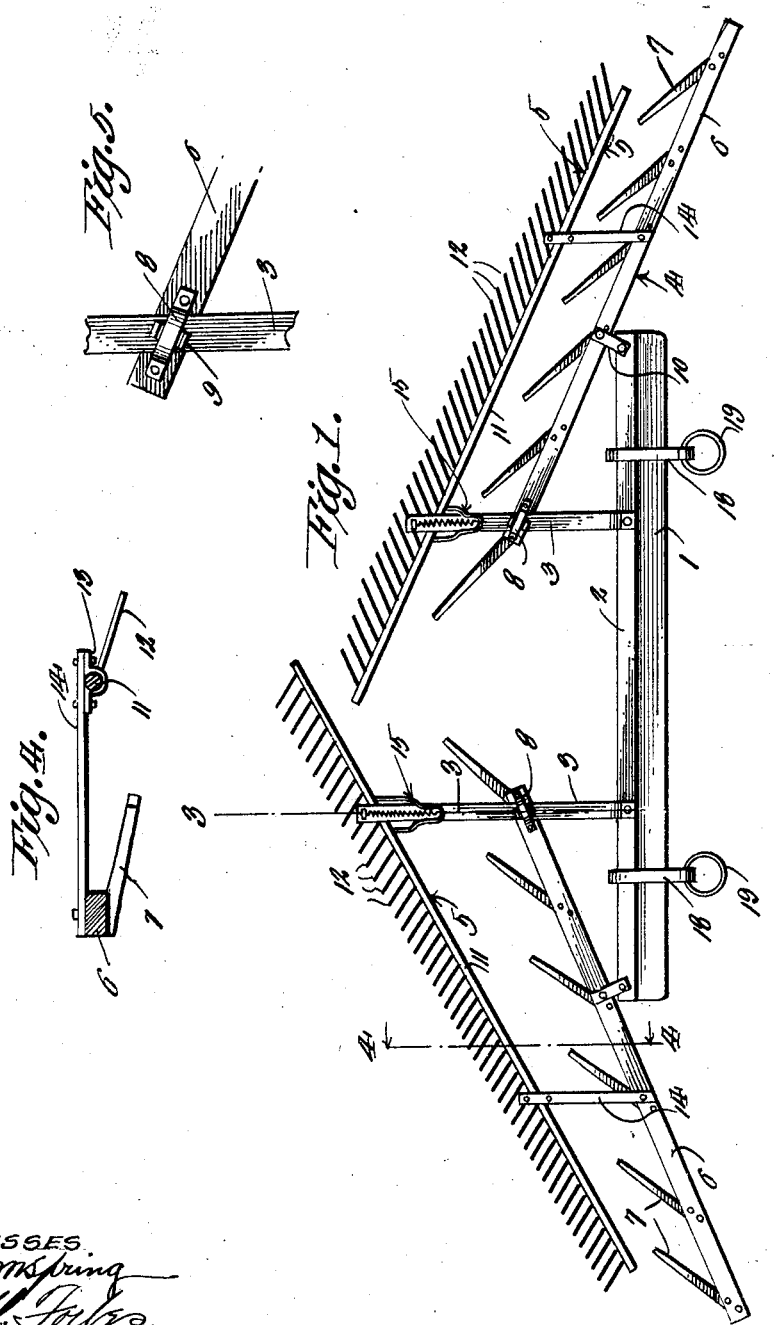
Figure 1 is a top plan view of the cultivator attachment embodying this invention.

Referring now to the drawings in detail wherein like numerals of reference indicate corresponding parts throughout the several views, the numeral 1 indicates a hitch beam which is preferably constructed of a hard wood and has secured longitudinally thereof at one edge an angle iron or other iron beam 2.

Secured to the beam 2 at each side of the transverse center thereof is a rearwardly extending draw beam 3, one of which draw beams is of greater length than the other for the purpose hereinafter described.

Positioned in tandem relation behind the hitch beam 1 and extending at an angle across each end thereof is a pair of rake units 4 and 5, each unit 4 comprising a back bar or beam 6, the under face of which has secured thereto a plurality of coarse teeth 7 which teeth are arranged at an acute angle with respect to the back beam 6 as is clearly shown in Figure 1, and these teeth are normally directed downwardly to engage the ground over which the attachment travels.

The back beams 6 of each of the coarse toothed units 4 extend at an angle across the rear side of each end of the hitch beam 1 and the opposed inner ends of the beams 6 are each attached to an adjacent one of the beams 3, by means of the strap member 8 which extends over the beam 3 and has each end riveted or otherwise secured to the beam 6, as is clearly shown in Figure 5. Positioned beneath the securing straps 8 is a cradle or plate member 9 which prevents direct contact of the strap 8 with the supporting draw beam 3 and thus takes the wear which this beam otherwise would receive. From this manner of attaching the rake unit 4 it will be seen that the teeth 7 thereof are directed inwardly and rearwardly toward the transverse center of the attachment and the whole rake moves with the attachment at an acute angle with respect to the forward line of travel of the same.

The central portion of each rake beam 6 is connected to the adjacent end of the hitch beam by means of the link 10. By this it will be readily understood how the rakes are maintained at the angle described.

Following each of the rake units 4 is a rake unit 5 which comprises the back bar 11 from which extends at an acute angle with respect to the length thereof, a plurality of relatively fine teeth 12. These teeth 12 extend away from the transverse center of the attachment or in opposite directions to the teeth 7 and the inner end of one of the units 5 overlaps the inner end of the other unit as shown in Figure 1 which overlapping unit is carried upon the rear end of the longer one of the draw beams 3, in the following manner.

Figure 3:
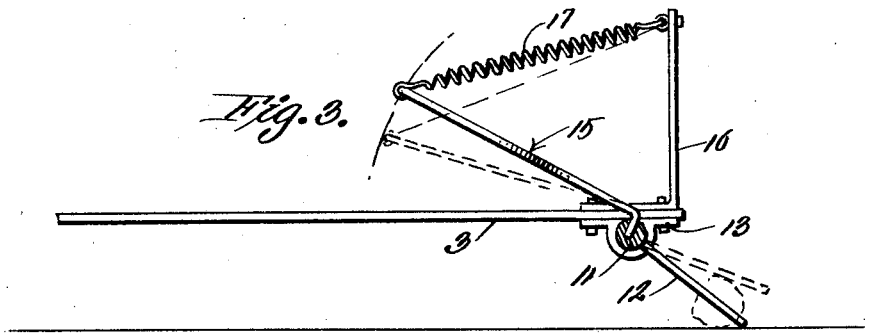
Figure 3 is a section taken substantially upon the line 3—3 of Figure 1.

Each of the draw beams 3 has secured to its under side at the rear end thereof, a bearing 13 through which the rake back 11 of the adjacent unit 5, extends, these rake backs being preferably of circular cross section as shown in Figure 3.

Adjacent the outer end of each rake unit 5 is secured one end of a draw link 14, the other end of which is secured to the back beam of the preceding unit 4.

Figure 2:
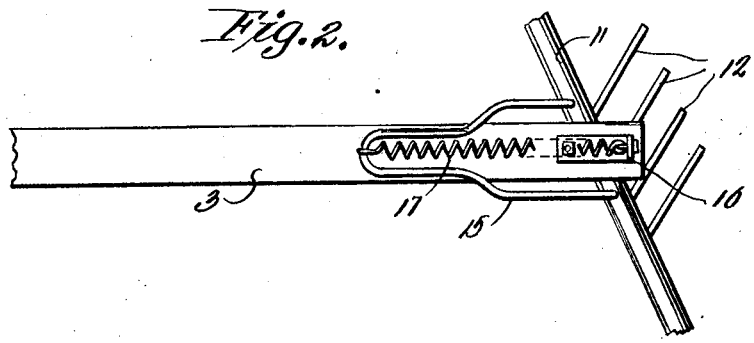
Figure 2 is an enlarged top plan view of a detail of the structure showing a control means for the fine toothed rake element.

The back bar 11 of each rake unit 5 carries a substantially U-shaped member indicated generally by the numeral 15, which U-shaped member straddles the attached draw beam 3 as shown in Figures 1 and 2, and has the free end of each leg secured in the back beam of the rake. Mounted upon the top of the rear end of each draw beam 3 is an upstanding bracket arm 16 and connecting the upper end of the arm 16 with the yoke portion of the adjacent U-shaped member 15 is a draw spring 17. From this it will be readily seen that the action of the springs upon the members 15, is such as to cause the free ends of the teeth 12 of the rake units 5 to constantly engage the surface of the ground but, in the event that the rake passes over an obstruction which can not be broken up, the springs 17 will allow the rake to rise to pass over the obstruction. In this manner damage to the rake units 5 is prevented.

Secured about the hitch beam 1, adjacent each end thereof is a strap member 18 to which is attached the connecting ring 19 by means of which the device may be attached to a cultivator.

From the foregoing description, it will be readily seen that when the present attachment is in use, the plowed up earth over which it passes will be readily broken up and pulverized and at the same time will be made level readily for the planting of seed.

Having thus described my invention, what I claim is:

1. A cultivator attachment of the character described, comprising means for securing the attachment to a cultivator, and a pair of rake units arranged in tandem relation and secured to said cultivator attaching means at an acute angle to the line of travel of the cultivator, the leading one of said units being provided with teeth of materially heavier construction than the teeth of the following unit, and those teeth of the forward unit being directed oppositely to the teeth of the following unit.

2. In a cultivator attachment of the character described, a hitch beam, means for mounting said beam transversely of the rear of the cultivator, a rearwardly extending draw beam attached at one end to said hitch beam upon each side of the transverse center thereof, a pair of rake units each comprising a back bar and a plurality of relatively heavy teeth extending therefrom for engagement with the earth, each having one end secured to a draw beam intermediate the ends thereof, means for securing the back beam of each of said rake units intermediate its ends, to the adjacent end of said hitch beam, a rake unit having a plurality of relatively fine teeth, arranged rearwardly of each of said first mentioned units, means for swingingly attaching the inner end of each of said fine toothed rake units to the rear end of a draw beam, and securing means between the outer ends of the first mentioned rake units and following fine toothed unit.

In testimony whereof I affix my signature.

ALBERT HOEKSTRA.